United States Patent
Farsaii (10) Patent No.: US 11,335,349 B1
(45) Date of Patent: May 17, 2022

(54) MACHINE-LEARNING CONVERSATION LISTENING, CAPTURING, AND ANALYZING SYSTEM AND PROCESS FOR DETERMINING CLASSROOM INSTRUCTIONAL EFFECTIVENESS

(71) Applicant: Siamak Farsaii, Irving, TX (US)

(72) Inventor: Siamak Farsaii, Irving, TX (US)

(73) Assignee: Visionary Technologies LLC, Austin, TX (US)

( * ) Notice: Subject to any disclaimer, the term of this patent is extended or adjusted under 35 U.S.C. 154(b) by 309 days.

(21) Appl. No.: 16/824,419

(22) Filed: Mar. 19, 2020

Related U.S. Application Data (60) Provisional application No. 62/821,078, filed on Mar. 20, 2019.

(51) Int. Cl.
| | | |
|---|---|---|
| *G10L 15/26* | (2006.01) | |
| *G06N 20/00* | (2019.01) | |
| *G09B 5/00* | (2006.01) | |

(52) U.S. Cl.
CPC .............. *G10L 15/26* (2013.01); *G06N 20/00* (2019.01); *G09B 5/00* (2013.01)

(58) Field of Classification Search
CPC ........... G10L 15/26; G06N 20/00; G09B 5/00
USPC ...................................................... 704/270.1
See application file for complete search history.

(56) References Cited

U.S. PATENT DOCUMENTS

| | | | | |
|---|---|---|---|---|
| 5,387,104 | A * | 2/1995 | Corder | G09B 5/14 434/350 |
| 6,055,498 | A * | 4/2000 | Neumeyer | G10L 15/26 704/E15.005 |
| 9,224,309 | B2 * | 12/2015 | Mutlu | A61B 5/375 |
| 9,491,167 | B2 * | 11/2016 | Talhami | G06N 20/00 |
| 11,132,913 | B1 * | 9/2021 | Ramanarayanan | G09B 5/06 |
| 2002/0156632 | A1 * | 10/2002 | Haynes | G09B 17/003 704/270 |
| 2005/0119769 | A1 * | 6/2005 | Labreuche | G06N 5/041 700/52 |
| 2007/0011005 | A1 * | 1/2007 | Morrison | G09B 5/06 704/231 |
| 2007/0134630 | A1 * | 6/2007 | Shaw | G09B 7/02 434/169 |
| 2009/0258333 | A1 * | 10/2009 | Yu | G09B 19/06 434/157 |
| 2009/0313540 | A1 * | 12/2009 | Otuteye | G06F 40/284 715/272 |
| 2010/0145729 | A1 * | 6/2010 | Katz | G06Q 10/06315 434/362 |
| 2010/0190142 | A1 * | 7/2010 | Gal | G09B 5/00 434/322 |
| 2014/0057242 | A1 * | 2/2014 | Sherman | G09B 7/00 434/353 |

(Continued)

*Primary Examiner* — Thuykhanh Le
(74) *Attorney, Agent, or Firm* — Plager Schack LLP; Mark H. Plager; Stephen Hallberg (57) ABSTRACT

A machine-learning conversation listening, capturing, and analyzing system that determines instructional effectiveness is a classroom setting and a machine-learning conversation listening, capturing, and analyzing process for determining classroom instructional effectiveness are disclosed. The machine-learning conversation listening, capturing, and analyzing system and process for determining classroom instructional effectiveness relies on predetermined objective criteria and uses big data, deep learning, and redundancy to validate results.

5 Claims, 7 Drawing Sheets

(56) References Cited

U.S. PATENT DOCUMENTS

| | | | |
|---|---|---|---|
| 2015/0050623 A1* | 2/2015 | Falash | G09B 9/24 |
| | | | 434/362 |
| 2015/0125843 A1* | 5/2015 | Mayumi | G06F 3/048 |
| | | | 434/350 |
| 2015/0221303 A1* | 8/2015 | Kang | G06F 40/20 |
| | | | 704/231 |
| 2017/0206797 A1* | 7/2017 | Solomon | G06N 3/006 |
| 2018/0158359 A1* | 6/2018 | Quinlan | G06F 3/013 |
| 2018/0350252 A1* | 12/2018 | Takada | G09B 19/025 |
| 2019/0096533 A1* | 3/2019 | Ramaci | G10L 15/22 |
| 2021/0076002 A1* | 3/2021 | Peters | G06V 40/20 |
| 2021/0142690 A1* | 5/2021 | Wenger | G06N 3/008 |
| 2021/0407310 A1* | 12/2021 | Finch | G06F 40/279 |
| 2022/0044583 A1* | 2/2022 | Sherman | G06Q 50/205 |

\* cited by examiner

WORD CLOUD

WHERE LABEL
WHEN WHO WHAT FIND DEFINE
SHOW HOW WHICH

- 0 WORDS IN TOPIC
- WITH 10 WORDS
- CLOUD PREFERENCES
- ☑ COLOR WORDS
- WORDS TILT: ○······ NO
- REGENERATE WORD CLOUD

WORDS AND WEIGHTS

| WEIGHT ∨ | WORD |
|---|---|
| 30 | WHAT |
| 14 | WHERE |
| 14 | HOW |
| 11 | WHEN |
| 2 | DEFINE |
| 2 | LABEL |
| 1 | WHO |
| 1 | SHOW |
| 1 | FIND |
| 1 | WHICH |

| | I | FREQ. | II | FREQ. | III | FREQ. | IV | FREQ. | V | FREQ. | VI | FREQ. |
|---|---|---|---|---|---|---|---|---|---|---|---|---|
| | WHAT | 30 | DEMONSTRATE | 2 | USE | 5 | CONCLUDE | 6 | CONCLUDE | 6 | DISCUSS | 3 |
| | WHERE | 14 | SHOW | 1 | | | | | JUSTIFY | 2 | HAPPEN | 1 |
| | HOW | 14 | | | | | | | | | | |
| | WHEN | 11 | | | | | | | | | | |
| | DEFINE | 2 | | | | | | | | | | |
| | LABEL | 2 | | | | | | | | | | |
| | WHO | 1 | | | | | | | | | | |
| | SHOW | 1 | | | | | | | | | | |
| | FIND | 1 | | | | | | | | | | |
| | WHICH | 1 | | | | | | | | | | |
| | NAME | 1 | | | | | | | | | | |
| | TOTAL | 78 | | 3 | | 5 | | 6 | | 8 | | 4 |
| | FINAL | 1.9 | | 0.48 | | 0.7 | | 0.78 | | 0.9 | | 0.6 |

MACHINE-LEARNING CONVERSATION LISTENING, CAPTURING, AND ANALYZING SYSTEM AND PROCESS FOR DETERMINING CLASSROOM INSTRUCTIONAL EFFECTIVENESS

This application claims benefit to U.S. Provisional Patent Application 62/821,078, entitled "MACHINE-LEARNING CONVERSATION LISTENING; CAPTURING, AND ANALYZING SYSTEM AND PROCESS FOR DETERMINING CLASSROOM INSTRUCTIONAL EFFECTIVENESS," filed Mar. 20, 2019. The U.S. Provisional Patent Application 62/821,078 is incorporated herein by reference.

BACKGROUND

Embodiments of the invention described in this specification relate generally to instructional improvement processes, and more particularly, to a machine-learning conversation listening, capturing, and analyzing system and process for determining classroom instructional effectiveness.

Quality of instruction varies from classroom to classroom. The existing evaluation systems are subjective, time consuming, and people dependent.

Currently the existing evaluation systems depend on the observer's subjective opinion of the evaluation criteria. Therefore, what is needed is a way to rely on predetermined objective criteria and employ big data, deep learning, and redundancy to validate results.

BRIEF DESCRIPTION

Novel systems and processes for determining classroom instructional effectiveness based on captured and analyzed conversations are disclosed. Some embodiments include a novel machine-learning conversation listening, capturing, and analyzing system that determines instructional effectiveness. In some embodiments, the machine-learning conversation listening, capturing, and analyzing system that determines instructional effectiveness relies on predetermined objective criteria and uses big data, deep learning, and redundancy to validate results.

Some embodiments include a novel machine-learning conversation listening, capturing, and analyzing process for determining instructional effectiveness. In some embodiments, the machine-learning conversation listening, capturing, and analyzing process determines classroom instructional effectiveness by way of a plurality of steps comprising (i) receiving a conversation audio clip by one of capturing an audio-only recording of interactions and dialogue during an instructional session and capturing an audio-visual recording ("video") of interactions and dialogue during the instructional session, (ii) generating a textual representation of the conversation audio clip by transcribing the conversation audio clip into a textual format, (iii) normalizing the textual representation based on natural language processing (NLP) standards, (iv) scoring the normalized textual representation to determine a level of effectiveness of the instructional session based on a plurality of machine learning processes, (v) reporting findings and visually outputting an effectiveness report with the overall effectiveness score of the instructional session on a system dashboard, and (vi) using supervised or unsupervised machine learning processes to compare and analyze immediate results against historical data for validity, reliability, and continuous improvement.

In some embodiments, the plurality of machine learning processes include a first machine learning process to convert the textual representation of the conversation audio clip into relevant chunks and code against established criteria, a second machine learning process to group and rank the coded data, and a third machine learning process to analyze the ranked coded data based on effectiveness criteria. In some embodiments, scoring the normalized textual representation to determine the level of effectiveness of the instructional session based on the plurality of machine learning processes comprises (a) generating coded data by performing the first machine learning process to convert the textual representation of the conversation audio clip into relevant chunks and code against established criteria, (b) generating ranked code data by performing the second machine learning process to group and rank the coded data, (c) scoring coded data for effectiveness by performing the third machine learning process to analyze the ranked coded data based on effectiveness criteria, (d) sequentially performing the plurality of machine learning processes for all coded data until all coded data are scored for effectiveness, and (e) generating an overall effectiveness score by compiling all coded data effectiveness scores from the instructional session.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments include a machine-learning conversation listening, capturing, and analyzing system that determines instructional effectiveness and a machine-learning conversation listening, capturing, and analyzing process for determining instructional effectiveness. In some embodiments, the machine-learning conversation listening, capturing, and analyzing system that determines instructional effectiveness relies on predetermined objective criteria and uses big data, deep learning, and redundancy to validate results.

Some embodiments include a novel machine-learning conversation listening, capturing, and analyzing process for determining instructional effectiveness. In some embodiments, the machine-learning conversation listening, capturing, and analyzing process determines classroom instructional effectiveness by way of a plurality of steps comprising (i) receiving a conversation audio clip by one of capturing an audio-only recording of interactions and dialogue during an instructional session and capturing an audio-visual recording ("video") of interactions and dialogue during the instructional session, (ii) generating a textual representation of the conversation audio clip by transcribing the conversation audio clip into a textual format, (iii) normalizing the textual representation based on natural language processing (NLP) standards, (iv) scoring the normalized textual representation to determine a level of effectiveness of the instructional session based on a plurality of machine learning processes, (v) reporting findings and visually outputting an effectiveness report with the overall effectiveness score of the instructional session on a system dashboard, and (vi) using supervised or unsupervised machine learning processes to compare and analyze immediate results against historical data for validity, reliability, and continuous improvement.

In some embodiments, the plurality of machine learning processes include a first machine learning process to convert the textual representation of the conversation audio clip into relevant chunks and code against established criteria, a second machine learning process to group and rank the coded data, and a third machine learning process to analyze the ranked coded data based on effectiveness criteria. In some embodiments, scoring the normalized textual representation to determine the level of effectiveness of the instructional session based on the plurality of machine learning processes comprises (a) generating coded data by performing the first machine learning process to convert the textual representation of the conversation audio clip into relevant chunks and code against established criteria, (b) generating ranked code data by performing the second machine learning process to group and rank the coded data, (c) scoring coded data for effectiveness by performing the third machine learning process to analyze the ranked coded data based on effectiveness criteria, (d) sequentially performing the plurality of machine learning processes for all coded data until all coded data are scored for effectiveness, and (e) generating an overall effectiveness score by compiling all coded data effectiveness scores from the instructional session.

As stated above, the quality of instruction varies from classroom to classroom. The existing evaluation systems are subjective, time consuming, and people dependent. Embodiments of the machine-learning conversation listening, capturing, and analyzing system and process for determining classroom instructional effectiveness described in this specification solve such problems by eliminating people as initial observers and by capturing and analyzing classroom performance based on any given criteria.

Embodiments of the machine-learning conversation listening, capturing, and analyzing system and process for determining classroom instructional effectiveness described in this specification differ from and improve upon currently existing options. In particular, the existing conventional evaluation processes rely on subjective opinions of human observers. In contrast, the machine-learning conversation listening, capturing, and analyzing system and process for determining classroom instructional effectiveness of the present disclosure utilizes machine learning methods to capture classroom conversations and analyze classroom performance. In addition, other methods require individual interventions, which are time consuming and subjective. Being subjective, they are also more prone to human error. However, the machine-learning conversation listening, capturing, and analyzing system and process for determining classroom instructional effectiveness process relies on predetermined objective criteria, and the use of big data, deep learning, and redundancy to validate results.

The machine-learning conversation listening, capturing, and analyzing system and process for determining classroom instructional effectiveness of the present disclosure may be comprised of the following elements. This list of possible constituent elements is intended to be exemplary only and it is not intended that this list be used to limit the machine-learning conversation listening, capturing, and analyzing system and process for determining classroom instructional effectiveness of the present application to just these elements. Persons having ordinary skill in the art relevant to the present disclosure may understand there to be equivalent elements that may be substituted within the present disclosure without changing the essential function or operation of the machine-learning conversation listening, capturing, and analyzing system and process for determining classroom instructional effectiveness.

1. Audio or video capture of classroom conversations using a smart device.
2. Convert the audio or video into textual format using a cloud-based solution.
3. Code the captured text based on predetermined criteria.
4. Group and analyze coded text into ranked data.
5. Compare ranked data against the pre-established evaluation criteria to determine levels of instructional effectiveness.
6. Score the level of effectiveness.
7. Report results and the effectiveness score.
8. Use supervised or unsupervised machine learning processes to compare and analyze immediate results against historical data for validity, reliability, and continuous improvement.
9. Maintain a dashboard of comparable historical results.

The various elements of the machine-learning conversation listening, capturing, and analyzing system and process for determining classroom instructional effectiveness of the present disclosure may be related in the above fashion or in other exemplary ways. It is not intended to limit the scope or nature of the relationships between the various elements and the following examples are presented as illustrative examples only. For instance, other embodiments of the machine-learning conversation listening, capturing, and analyzing system and process for determining classroom instructional effectiveness may be comprised of the following other set of elements.

1. Capture audio or video of a teaching episode or an instructional session.
2. Transcribe the audio or the audio portion of the captured video to text.
3. Apply normalization to the resulting text based on natural language processing (NLP) standards.
4. Score the level of effectiveness using machine learning processes.
5. Report on the results and the effectiveness.
6. Use supervised or unsupervised machine learning processes to compare and analyze immediate results against historical data for validity, reliability, and continuous improvement.

In some embodiments, the machine-learning conversation listening, capturing, and analyzing process determines classroom instructional effectiveness by way of a plurality of steps comprising (i) receiving a conversation audio clip by one of capturing an audio-only recording of interactions and dialogue during an instructional session and capturing an audio-visual recording ("video") of interactions and dialogue during the instructional session, (ii) generating a textual representation of the conversation audio clip by transcribing the conversation audio clip into a textual format, (iii) generating coded data by performing a first of three looped machine learning steps to convert the textual representation of the conversation audio clip into relevant chunks and code against established criteria, (iv) generating ranked code data by performing a second of three looped machine learning steps to group and rank the coded data, (v) scoring coded data for effectiveness by performing a third of three looped machine learning steps to analyze the ranked coded data based on effectiveness criteria, (vi) performing the three looped machine learning steps until all coded data are scored for effectiveness, (vii) generating an overall effectiveness score by compiling all coded data effectiveness scores from the instructional session, and (viii) reporting findings and visually outputting an effectiveness report with the overall effectiveness score of the instructional session on a system dashboard.

The machine-learning conversation listening, capturing, and analyzing system and process for determining classroom instructional effectiveness of the present disclosure generally works by following the above process so that an objective observation can be conducted and reported to help improve the classroom instructional methods currently utilized. The process will be refined by encoding the captured data and comparing the coded data against the pre-established criterion to rank data using cases and if-then relationships.

Figure 1:
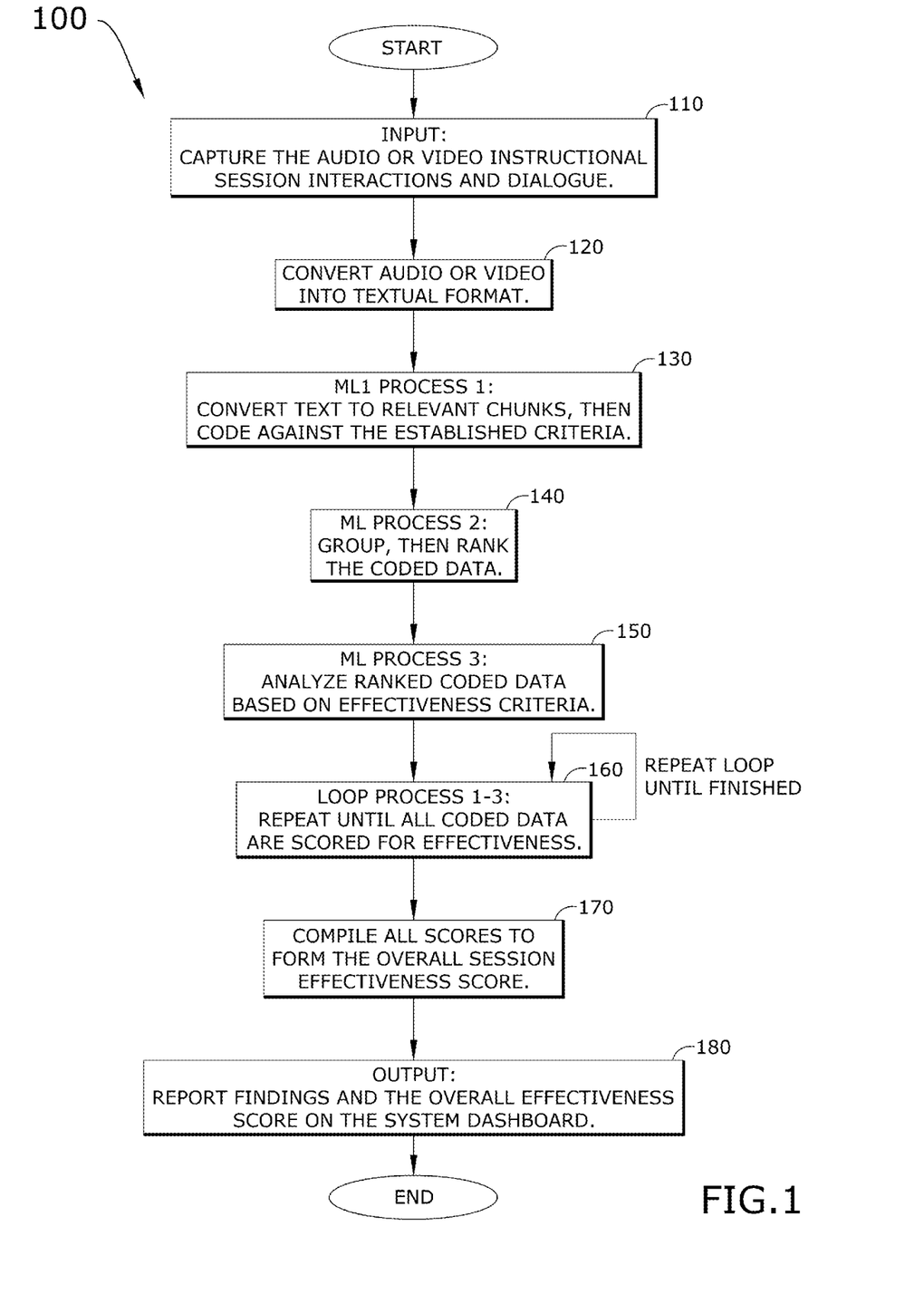
FIG. 1 conceptually illustrates a machine-learning conversation listening, capturing, and analyzing process for determining instructional effectiveness in some embodiments.

By way of example, FIG. 1 conceptually illustrates a machine-learning conversation listening, capturing, and analyzing process for determining instructional effectiveness 100. As shown in this figure, the machine-learning conversation listening, capturing, and analyzing process for determining instructional effectiveness 100 starts with input of data for an instructional session. In some embodiments, the input is received when the machine-learning conversation listening, capturing, and analyzing process for determining instructional effectiveness 100 captures audio (at 110) of interactions and dialogue during the instructional session. In some embodiments, the audio is captured by recording sounds of the interactions and dialogue as an audio clip. In some embodiments, the audio is captured by video recording the instructional session and thereby capturing the audio of the interactions and dialogue that are heard during the instructional session.

Next, the machine-learning conversation listening, capturing, and analyzing process for determining instructional effectiveness 100 of some embodiments performs a conversion process to transcribe the captured audio into textual format (at 120). In some embodiments, the conversion process performed by the machine-learning conversation listening, capturing, and analyzing process for determining instructional effectiveness 100 also includes normalizing the textual representation of the transcription based on natural language processing (NLP) standards. An example of a transcription word cloud based on transcribed text of an audio clip after normalization is performed is described below, by reference to FIG. 3.

After the transcription of the captured audio is normalized and made available, the machine-learning conversation listening, capturing, and analyzing process for determining instructional effectiveness 100 of some embodiments performs several steps for scoring the normalized textual representation to determine a level of effectiveness of the instructional session. In some embodiments, scoring of the normalized textual representation is based on a plurality of machine learning processes comprising a first machine learning process to convert the textual representation of the conversation audio clip into relevant chunks and code against established criteria, a second machine learning process to group and rank the coded data, and a third machine learning process to analyze the ranked coded data based on effectiveness criteria. The steps for performing these machine learning processes is described next.

In some embodiments, the machine-learning conversation listening, capturing, and analyzing process for determining instructional effectiveness 100 performs the first machine learning process (at 130) to convert the textual representation of the conversation audio clip into relevant chunks and code against established criteria. Next, the machine-learning conversation listening, capturing, and analyzing process for determining instructional effectiveness 100 performs the second machine learning process (at 140) to group and rank the coded data. Rounding out the machine learning processes, the machine-learning conversation listening, capturing, and analyzing process for determining instructional effectiveness 100 moves ahead to perform the third machine learning process (at 150) to analyze the ranked coded data based on effectiveness criteria. An example of a frequency score for one level of effectiveness using the machine learning processes is described below, by reference to FIG. 4.

In some embodiments, the plurality of machine learning processes are repeated in a looped fashion for all the coded data derived from the original corpus. Thus, the machine-learning conversation listening, capturing, and analyzing process for determining instructional effectiveness 100 of some embodiments proceeds to repeat (at 160) the steps at 130-150 in looped fashion until all the coded data are scored for effectiveness. Next, the machine-learning conversation listening, capturing, and analyzing process for determining instructional effectiveness 100 compiles (at 170) all the effectiveness scores to form the overall instructional session effectiveness score. Then, after the effectiveness scores are determined, the machine-learning conversation listening, capturing, and analyzing process for determining instructional effectiveness 100 provides visual output (at 180) to report the findings and overall effectiveness score for the instructional session. In some embodiments, the report is visually output on a system dashboard. In some other embodiments, the report is visually output to an alternate destination at the choice of a user interacting with the system. Then the machine-learning conversation listening, capturing, and analyzing process for determining instructional effectiveness 100 ends.

To make the machine-learning conversation listening, capturing, and analyzing system and process for determining classroom instructional effectiveness of the present disclosure, a person may implement a software application by programming the software (e.g., in a high-level programming language). For instance, the software may be programmed as a mobile app that runs on a smart device or as a web app that runs in a browser on a user computing device located proximate to a place in which an instructional session is to be captured and analyzed for effectiveness. In some embodiments, the machine learning processes are implemented as software programs or modules that run on a server, such as a cloud-based server that hosts a cloud-computing software-as-a-service (SaaS) to which a connection can be made for machine learning-based processing on the audio transcript and to determine effectiveness of the instructional session. For example, the software may run on the device to capture the classroom conversations and then share the recordings with the machine learning cloud-based system. The final analyzed results and reports are shared back with the initiating device and may be further stored for later analysis or instructional improvement. The results may also be shared with different groups, when applicable. Compiled annual historical results and scores also may help paint a bigger picture over the years.

Figure 2:
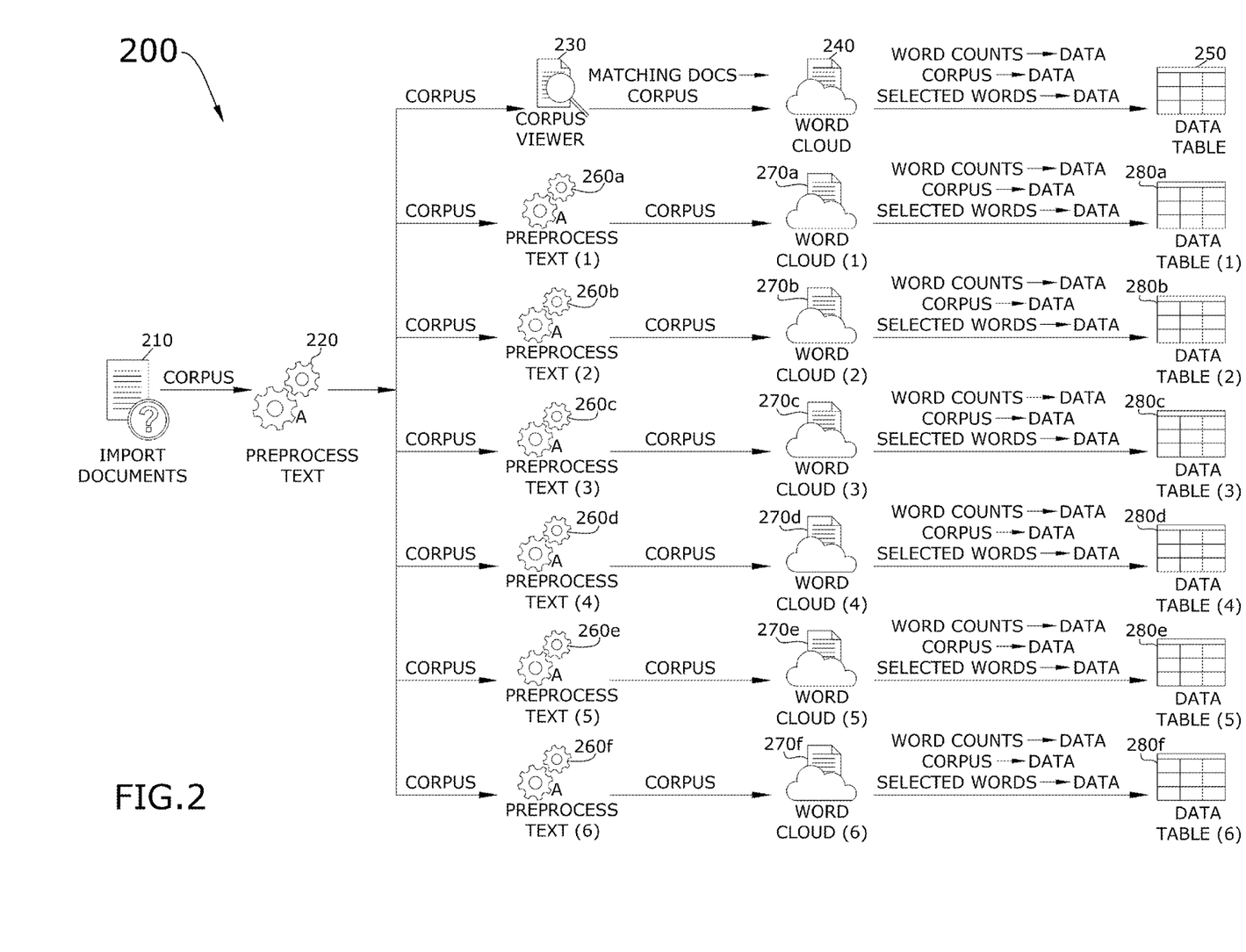
FIG. 2 conceptually illustrates a process visualization for a machine-learning conversation listening, capturing, and analyzing system that determines instructional effectiveness in some embodiments.

By way of example, FIG. 2 conceptually illustrates a process visualization for a machine-learning conversation listening, capturing, and analyzing system 200 that determines instructional effectiveness. As shown in this figure, the process visualization of the machine-learning conversation listening, capturing, and analyzing system 200 includes a document import 210, a preprocess text functional module 220, a corpus viewer 230, a corpus word cloud 240, a resulting corpus data table 250, a plurality of textual processing functions 260a-260f, a plurality of transcription word clouds 270a-270f, and a plurality of data table reports on effectiveness 280a-280f for the instructional session.

Specifically, the document import 210 is based on a captured audio clip from an audio recording or a video recording of a teaching episode or an instructional session (hereinafter referred to as "the instructional session"). The preprocess text functional module 220 includes one or more transcription functions to transcribe the captured audio clip. The corpus viewer 230 provides a full textual representation of the transcribed audio clip captured from the instructional session, and allows for normalization to be applied to the textual representation based on NLP standards. The normalized textual representation of the transcribed audio then forms a corpus word cloud 240, which is used in scoring the level of effectiveness (also by using machine learning processes, such as the plurality of machine learning processes described above by reference to FIG. 1).

Figure 3:
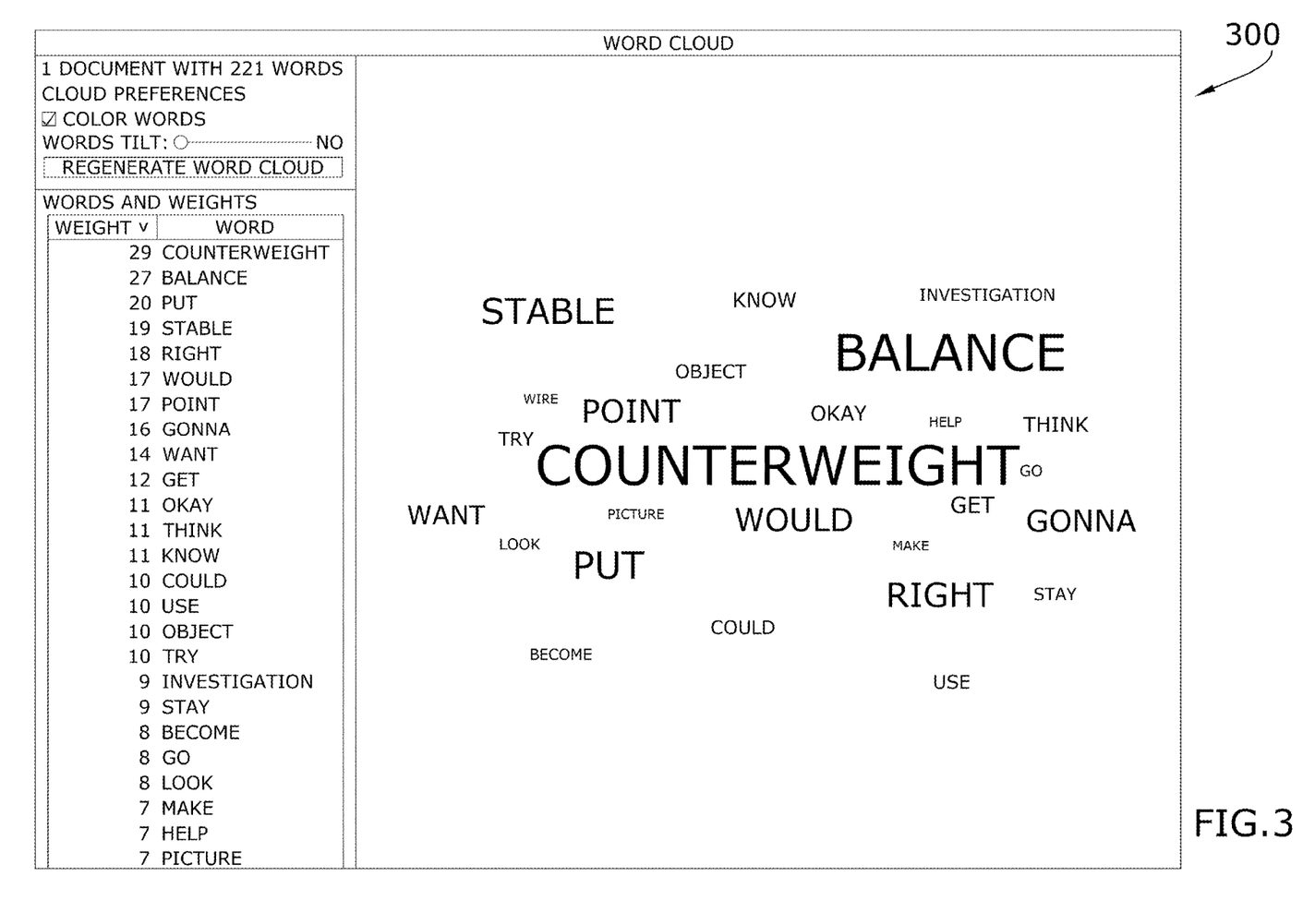
FIG. 3 conceptually illustrates a transcription word cloud of coded data from a textual representation of a conversation audio clip in some embodiments.

Turning to FIG. 3, as noted above, an example of a transcription word cloud 300 of coded data from a textual representation of an audio recording of an instructional session is conceptually illustrated. In reference to FIG. 2, the corpus word cloud 240 and the plurality of transcription word clouds 270a-270f are similar to the example of a transcription word cloud 300 shown in FIG. 3.

Turning back to FIG. 2, as shown here a report is generated in the form of a corpus data table 250, which includes data of word counts (frequency of words), data of total corpus word count in the corpus word cloud 240, and data of selected words.

Figure 4:
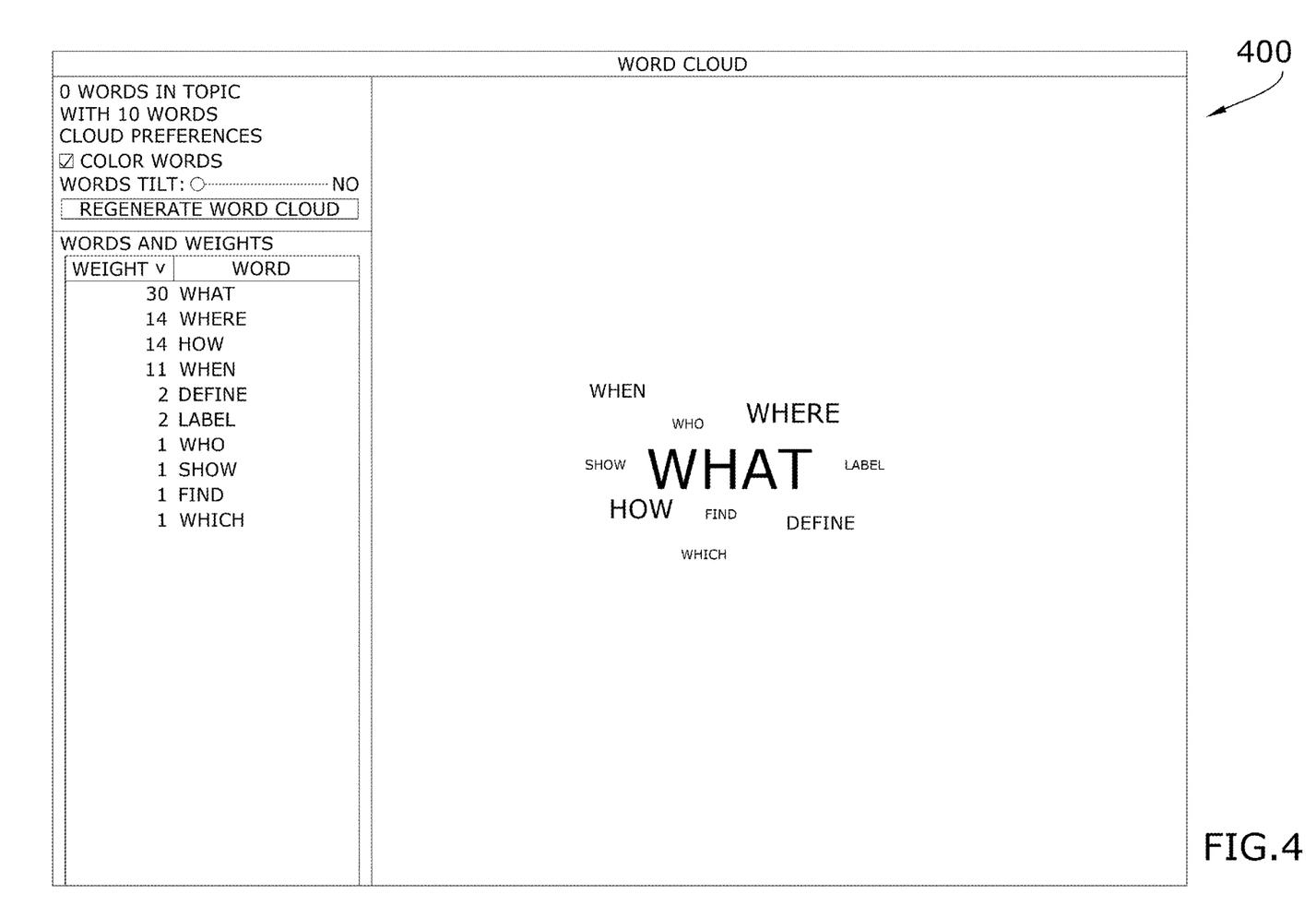
FIG. 4 conceptually illustrates frequency score as an example of an established criteria for coding, ranking, and scoring the data in some embodiments.

Turning now to FIG. 4, an example of a frequency score 400 is conceptually illustrated in an example that establishes criteria for coding, ranking, and scoring the data.

Back in FIG. 2, the plurality of textual processing functions 260a-260f also each perform scoring and weighting to develop the plurality of transcription word clouds 270a-270f, and thereby generate the resulting data table reports 280a-280f for the instructional session.

Figure 5:
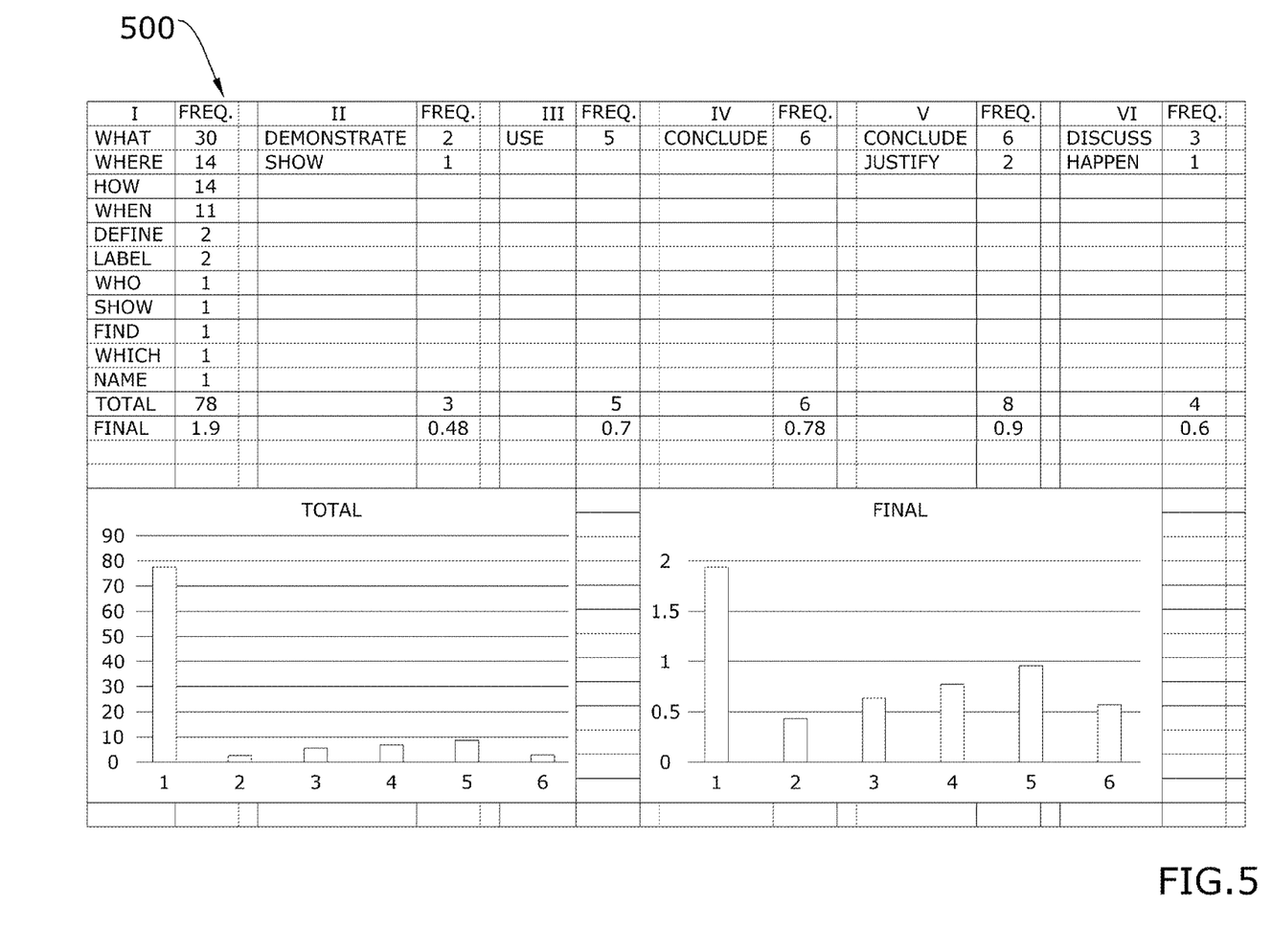
FIG. 5 conceptually illustrates an example of an effectiveness report with word frequency and scoring in some embodiments.

By way of example, FIG. 5 conceptually illustrates an example of an effectiveness report 500 with word frequency and scoring in some embodiments.

By using the machine-learning conversation listening, capturing, and analyzing system and process for determining classroom instructional effectiveness of the present disclosure, a teacher will have instant feedback about their classroom instructional performance. Additionally, an administrator can obtain an overall view of their school effectiveness and be able to pinpoint potential areas of need and support. Similarly, a central office or governing body, such as the school board, will be able to compare effectiveness across campuses.

Figure 6:
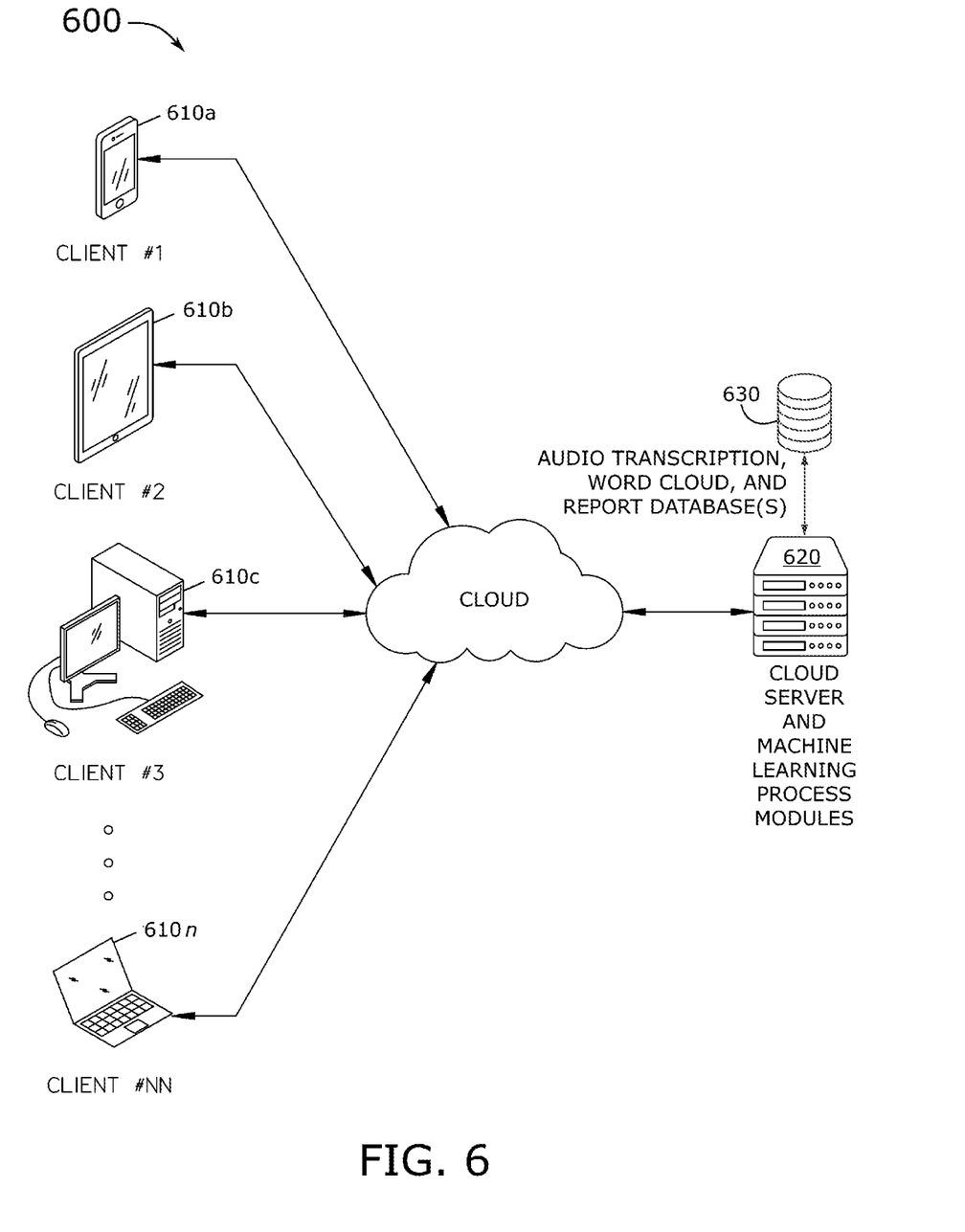
FIG. 6 conceptually illustrates a cloud-network architecture of a machine-learning conversation listening, capturing, and analyzing system in some embodiments.

In some embodiments, the machine-learning conversation listening, capturing, and analyzing system is deployed over a network architecture, such as a cloud-computing architecture. By way of example, FIG. 6 conceptually illustrates a cloud-network architecture of a machine-learning conversation listening, capturing, and analyzing system 600. As shown in this figure, the cloud-based machine-learning conversation listening, capturing, and analyzing system 600 includes a plurality of user computing devices 610a-610n that are used in a plurality of instructional or teaching environments to capture a plurality of instructional sessions or teaching episodes, and the interactions and dialogue heard during those instructional sessions or teaching episodes. When audio is captured by plurality of user computing devices 610a-610n, connections are made over a network (labeled "cloud" in this figure) to a machine-learning conversation listening, capturing, and analyzing cloud server 620 which includes a plurality of machine learning process modules 620. Audio transcriptions, word cloud data, and effectiveness scoring and reports are stored persistently in an audio transcription, word cloud, and report database 630 or multiple such databases, thereby allowing other users to view data, analyze reports and improve on instructional effectiveness now or at any future time (e.g., by reviewing a history of effectiveness reports for a particular instructor or institution, etc.).

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
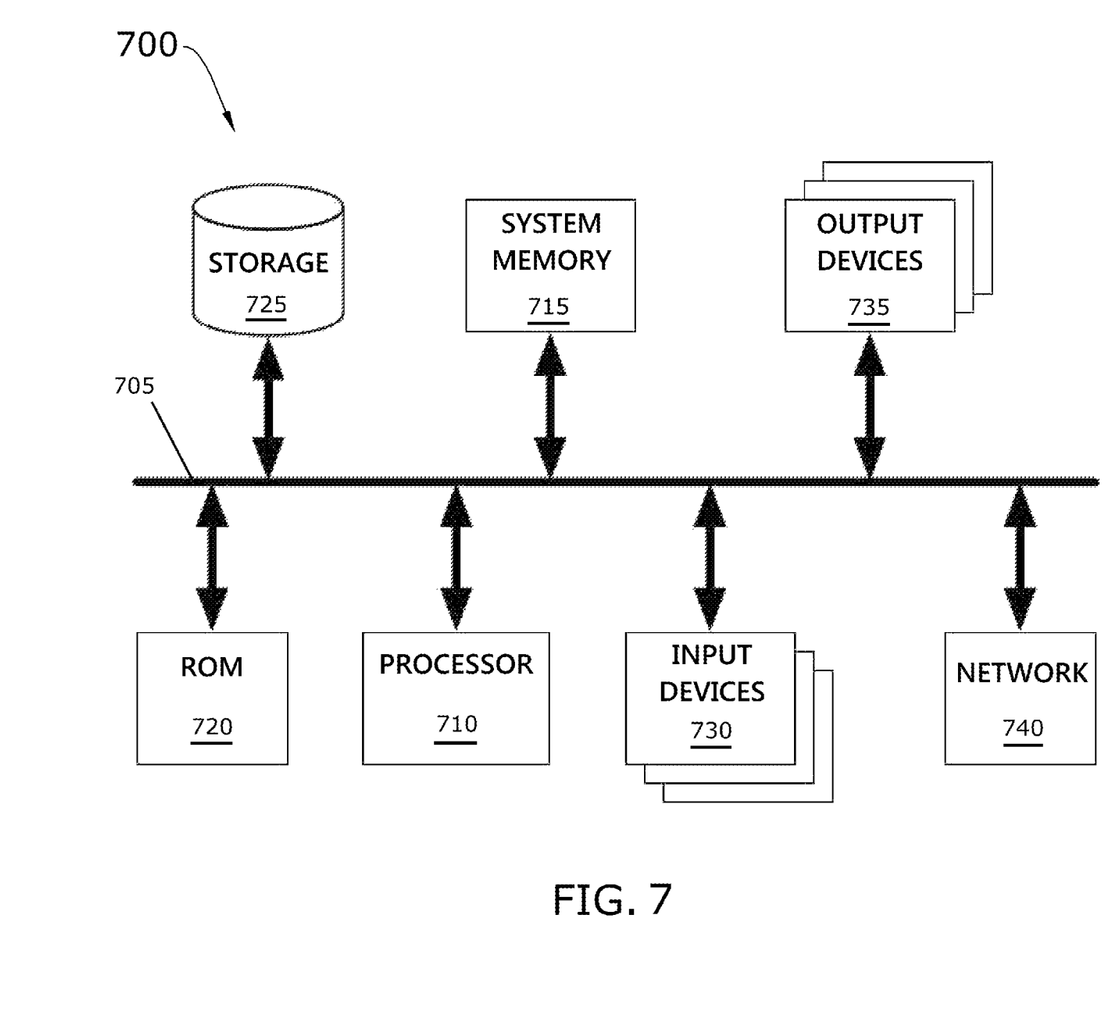
FIG. 7 conceptually illustrates an electronic system with which some embodiments of the invention are implemented.

FIG. 7 conceptually illustrates an electronic system 700 with which some embodiments of the invention are implemented. The electronic system 700 may be a computer, phone, tablet computing device, PDA, or any other sort of electronic device. Such an electronic system includes various types of computer readable media and interfaces for various other types of computer readable media. Electronic system 700 includes a bus 705, processing unit(s) 710, a system memory 715, a read-only 720, a permanent storage device 725, input devices 730, output devices 735, and a network 740.

The bus 705 collectively represents all system, peripheral, and chipset buses that communicatively connect the numerous internal devices of the electronic system 700. For instance, the bus 705 communicatively connects the processing unit(s) 710 with the read-only 720, the system memory 715, and the permanent storage device 725.

From these various memory units, the processing unit(s) 710 retrieves instructions to execute and data to process in order to execute the processes of the invention. The processing unit(s) may be a single processor or a multi-core processor in different embodiments.

The read-only-memory (ROM) 720 stores static data and instructions that are needed by the processing unit(s) 710 and other modules of the electronic system. The permanent storage device 725, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 725.

Other embodiments use a removable storage device (such as a floppy disk or a flash drive) as the permanent storage device 725. Like the permanent storage device 725, the system memory 715 is a read-and-write memory device. However, unlike storage device 725, the system memory 715 is a volatile read-and-write memory, such as a random access memory. The system memory 715 stores some of the instructions and data that the processor needs at runtime. In some embodiments, the invention's processes are stored in the system memory 715, the permanent storage device 725, and/or the read-only 720. For example, the various memory units include instructions for processing appearance alterations of displayable characters in accordance with some embodiments. From these various memory units, the processing unit(s) 710 retrieves instructions to execute and data to process in order to execute the processes of some embodiments.

The bus 705 also connects to the input and output devices 730 and 735. The input devices enable the user to communicate information and select commands to the electronic system. The input devices 730 include alphanumeric keyboards and pointing devices (also called "cursor control devices"). The output devices 735 display images generated by the electronic system 700. The output devices 735 include printers and display devices, such as cathode ray tubes (CRT) or liquid crystal displays (LCD). Some embodiments include devices such as a touchscreen that functions as both input and output devices.

Finally, as shown in FIG. 7, bus 705 also couples electronic system 700 to a network 740 through a network adapter (not shown). In this manner, the computer can be a part of a network of computers (such as a local area network ("LAN"), a wide area network ("WAN"), or an intranet), or a network of networks (such as the Internet). Any or all components of electronic system 700 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 1 conceptually illustrates a process. The specific operations of this process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A machine-learning conversation listening, capturing, and analyzing process for determining classroom instructional effectiveness comprising:
   capturing audio content of classroom conversations via a smart device;
   converting the audio content into text formatted content via a cloud-based voice-to-text service;
   encoding the text content based on a set of predetermined criteria;
   grouping and analyzing the encoded text content into ranked data;
   comparing the ranked data to pre-established evaluation criteria;
   determining a level of instructional effectiveness based on the comparison of the ranked data to the pre-established evaluation criteria;
   scoring the level of instructional effectiveness;
   reporting immediate results, wherein the immediate results comprise the level of instructional effectiveness and the instructional effectiveness score;
   using machine learning processes to compare and analyze immediate results against historical data for validity, reliability, and continuous improvement; and
   maintaining a dashboard of comparable historical results.

2. The machine-learning conversation listening, capturing, and analyzing process of claim 1, wherein the audio content is an exclusively audio content stream recorded by the smart device.

3. The machine-learning conversation listening, capturing, and analyzing process of claim 1, wherein the audio content is an audio channel of an audio-visual video content streamed video recorded by the smart device.

4. The machine-learning conversation listening, capturing, and analyzing process of claim 1, wherein using machine learning processes to compare and analyze immediate results against historical data for validity, reliability, and continuous improvement comprises using supervised machine learning processes to compare and analyze immediate results against historical data for validity, reliability, and continuous improvement.

5. The machine-learning conversation listening, capturing, and analyzing process of claim 1, wherein using machine learning processes to compare and analyze immediate results against historical data for validity, reliability, and continuous improvement comprises using unsupervised machine learning processes to compare and analyze immediate results against historical data for validity, reliability, and continuous improvement.

* * * * *